United States Patent

Bleakley et al.

[11] Patent Number: 5,733,461
[45] Date of Patent: *Mar. 31, 1998

[54] PROCESS FOR THE TREATMENT OF WASTE MATERIAL SUSPENSIONS

[75] Inventors: Ian Stuart Bleakley; Hannu Olavi Ensio Toivonen, both of St. Austell, United Kingdom

[73] Assignee: ECC International Limited, United Kingdom

[*] Notice: The term of this patent shall not extend beyond the expiration date of Pat. No. 5,558,782.

[21] Appl. No.: 715,832

[22] Filed: Sep. 19, 1996

Related U.S. Application Data

[63] Continuation-in-part of Ser. No. 355,038, Dec. 13, 1994, Pat. No. 5,558,782, which is a continuation-in-part of Ser. No. 171,018, Dec. 21, 1993, abandoned, and a continuation-in-part of Ser. No. 521,010, Aug. 30, 1995, abandoned, which is a continuation of Ser. No. 171,018.

[30] Foreign Application Priority Data

Dec. 23, 1992 [EP] European Pat. Off. ............ 92311774

[51] Int. Cl.$^6$ ............................................. C02F 1/52
[52] U.S. Cl. ..................... 210/712; 162/189; 162/190; 210/716; 210/717; 210/726; 210/928
[58] Field of Search ................. 162/29, 189, 190; 209/5; 210/702, 711, 712, 716, 717, 723, 724, 726, 917, 928

[56] References Cited

U.S. PATENT DOCUMENTS

| | | | |
|---|---|---|---|
| 2,470,577 | 5/1949 | Roderick et al. | 106/306 |
| 2,941,942 | 6/1960 | Dahlstrom et al. | 210/726 |
| 3,152,001 | 10/1964 | Podschus et al. | 106/306 |
| 3,262,877 | 7/1966 | Le Compte | 210/47 |
| 3,639,206 | 2/1972 | Spruill | 210/928 |
| 3,736,254 | 5/1973 | Croom | 210/928 |
| 3,833,463 | 9/1974 | Croom | 210/928 |
| 4,017,391 | 4/1977 | Black | 423/175 |
| 4,076,620 | 2/1978 | Opferkuch et al. | 210/45 |
| 5,082,887 | 1/1992 | Brown et al. | 524/413 |
| 5,262,006 | 11/1993 | Andersson et al. | 162/147 |
| 5,558,782 | 9/1996 | Bleakley et al. | 210/712 |

FOREIGN PATENT DOCUMENTS

| | | |
|---|---|---|
| 2 265 916 | 4/1993 | United Kingdom . |
| WO 79/00870 | 11/1979 | WIPO . |
| WO 87/00544 | 1/1987 | WIPO . |
| WO 88/02048 | 3/1988 | WIPO . |
| WO 96/28517 | 9/1996 | WIPO . |

OTHER PUBLICATIONS

Murray, H.H. (ed.), 1996, TAPPI Monograph Series No. 30 "Paper Coating Pigments", pp. 34–35.

Primary Examiner—Peter A. Hruskoci
Attorney, Agent, or Firm—Klauber & Jackson

[57] ABSTRACT

There is disclosed a process for separating fine solids from water in the used water recovery system of a sheet forming mill, wherein the used water recovery system includes at least one stage in which an alkaline earth metal carbonate is precipitated in the aqueous suspension constituting the used water whereby the particulate material present in the used water becomes entrained in the alkaline earth metal carbonate precipitate. By the invention it is possible to recover the water and the fine solid materials which pass through the wire mesh belt of a paper or board forming machine, and optionally recycle those recovered materials.

21 Claims, 7 Drawing Sheets

PROCESS FOR THE TREATMENT OF WASTE MATERIAL SUSPENSIONS

CROSS-REFERENCE TO RELATED APPLICATIONS

This application is a continuation-in-part of application Ser. No. 08/355,038 filed Dec. 13, 1994 and issued as U.S. Pat. No. 5,558,782 on Sep. 24th, 1996, which is a continuation-in-part of Ser. No. 08/171,018 filed Dec. 21, 1993, now abandoned, and a continuation-in-part of application Ser. No. 08/521,010 filed Aug. 30, 1995, now abandoned, which is a continuation of application Ser. No. 08/171,018 filed Dec. 21, 1993 and now abandoned.

BACKGROUND OF THE INVENTION

1. Field of the Invention

The present invention relates to a method for the recovery and use of solid materials which are contained in a paper mill aqueous stream employed for the recovery of solid particulate material.

Sheet cellulosic products, for example paper and board, herein generally referred to as "paper", are generally manufactured in a paper plant or mill on machines of the type in which a dilute suspension of finely divided solid materials in water is spread evenly over the surface of a moving wire mesh belt, which is generally referred to in the art as the "wire", and water is drawn through the wire by gravity and by suction to leave a thin felt-like mat of the solid materials on the wire. When the web of sheet material formed in this way is partially dewatered it is transferred from the wire to a moving felt band which provides it with support while further dewatering is carried out.

The solid material used in the formation of paper generally consists predominantly of fibres which are most commonly of cellulose, but which may contain a proportion of synthetic fibres. The fibrous material may be prepared, for example, by subjecting wood to a series of mechanical and/or chemical processes which separate the fibres substantially one from another and make them available for the sheet forming process in lengths ranging from about 10 μm to several millimetres. The solid material will often also include a particulate mineral material as a filler, the particles ranging in size from a fraction of a micrometer to about 50 μm.

In order to manufacture a sheet material of homogeneous composition and uniform thickness, it is generally necessary to apply the solid material to the wire of the paper machine in the form of a very dilute aqueous suspension containing from about 0.5% to 1.0% by weight of solid material. This means that a very large quantity of water is required for the manufacture of paper and board; in fact the weight required is approximately two hundred times the weight of solid material used. It is therefore essential in most mills in operation that for environmental and economic reasons as much as possible of the water which passes through the wire or is removed from the web of sheet material at a later stage is recovered for further use.

The water passing through the wire generally carries with it a substantial amount of fibrous or particulate material which is too fine to be retained by the mat of sheet material formed on the wire. This solid material is generally referred to as "fines", and may be organic or inorganic in nature. A useful definition of this term is given in the TAPPI Standard No. T 261 cm-90 "Fines fraction of paper stock by wet screening". That document describes a method for measuring the fines content of paper making stock or of pulp samples, and specifies that fines are those particles which will pass a round hole of diameter 76 μm. Generally up to about 50% by weight of the solid material in the aqueous suspension which is fed to the head box of the sheet forming machine passes through the wire, and if not recovered for re-use is wasted and must be replaced. From about 1% to about 5% by weight of the solid material which is fed to a paper or board making process is finally rejected. Of this material, about 5% by weight is rejected because it is too coarse to be incorporated, and the remainder consists of fines.

The water which passes through the wire is generally referred to as "white water" on account of its high content of fine solids which gives it a high turbidity. This white water is usually recirculated to the plant in which the paper making stock is prepared in the paper making process in what is called the "primary circulation loop". However, not all the white water can be recirculated in this way because less water is carried away from the sheet material forming machine in the moist web than is introduced with the new solid material. The excess white water is withdrawn from the primary circulation loop and is processed in a secondary circulation loop which is intended to separate as completely as possible the solid materials from the suspending water, so that the solid material can either be re-used in the stock preparation process, or discharged as waste. The water which is then substantially free of suspended solids can then either be re-used in the paper making process in the sheet material forming plant, for example in sprays or "showers", or as pump sealing water, in various parts of the process, or otherwise or may be discharged to a convenient natural water course.

The secondary circulation loop conventionally makes use of various pieces of apparatus which are known generically as "save-alls". These generally operate on one of three principles, namely sedimentation, or filtration or flotation. In the sedimentation type of save-all the white water flows very slowly through a large tank so that the solid material sinks to the bottom and substantially clear water overflows at the top. It is usually necessary to add a chemical coagulant to the white water so that the solid material is present in the form of clusters of particles, rather than as discrete particles. Also the sedimentation type of save-all is rarely adequate on its own, but needs to be used in conjunction with additional separation equipment. The filtration type of save-all is operated by passing the white water through a filter medium, which may conveniently be a fine wire mesh, which is generally pre-coated with a layer of fibres to improve filtration. Again it is usually necessary to add a chemical flocculant to improve the separation of the solid particles from the water. In the flotation save-all process, the white water is introduced into a vessel in which a rising stream of fine air bubbles is provided. Air is dissolved under pressure in the white water feed to the flotation save-all, and, when the pressure is reduced to the atmospheric level as the white water enters the flotation vessel, the solid particles act as nuclei onto which the air comes out of solution and forms bubbles. The solid particles with attached bubbles rise to the surface where they are skimmed off by rotating paddles. It is usually necessary to use two or more save-alls in series to achieve acceptable separation of solid material from the water.

Clarified water obtained from the save-alls is normally returned to the paper making process and the removed solids are thickened and rejected. The water from the thickening processes is normally fed to an effluent treatment plant where it is combined with other effluent streams, purified by mechanical and/or chemical and/or biochemical processes and discharged as effluent to local water systems (eg. to a local lake, river or sea). The effluent water may contain some fines which are normally lost, although these may advantageously be recovered by the process described and claimed in copending U.S. patent application Ser. No. 521,010 referred to hereinbefore.

2. Brief Description of the Prior Art

As noted hereinbefore, chemical treatments are known and used to aid the fines recovery in paper making save-alls and are aimed at aggregating the fines to larger particles by polymers to improve filtration or sedimentation, or at modifying the surface of the solid particles by surfactants in order to improve the flotation process. Further chemical treatment may be used to aid the water removal in pressing the solids from the secondary save-all, and again polymers are typically used in this task.

A chemical process for dealing with the solid material in a paper plant final effluent stream rather than a stream employed for recycle purposes is described by O'Brien in U.S. Pat. No. 4,115,188. The solids present are coagulated and flocculated by changes in pH.

The present invention, as described hereinafter, is concerned with forming an inorganic precipitate in the aqueous stream containing the fines and thereby forming a useful product which can be re-used for example in paper making. Such a process is not suggested in the prior art.

Formation of a precipitate in an aqueous stream is known per se. For example, such a process is described by Le Compte in U.S. Pat. No. 3,262,877, Spruill in U.S. Pat. No. 3,639,206 and Opferkuch in U.S. Patent but in these cases the treated aqueous stream is not concerned with a predominantly fines containing stream in paper making and there is no disclosure or suggestion of making use of the precipitate formed in paper making or other processes.

Andersson in U.S. Pat. No. 5,262,006 describes precipitation onto fibres in a fibre pulp stock containing substantial amounts of gypsum. In this case, the product is intended to be used in a paper making process. However, the process is directed at the treatment only of certain kinds of pulp compositions and treatment of aqueous streams containing predominantly fines is not suggested or disclosed in the reference.

Hokuetsu JP 60-297382 describes precipitation onto raw cellulose fibres to improve the adherence of filler particles onto the fibres for use in paper making. The use of precipitation to treat a water stream in which the solids are primarily fine rather than large raw fibres is not disclosed or suggested by Hokuetsu.

SUMMARY OF THE PRESENT INVENTION

The problem of recovering fines in an aqueous fines-containing stream in a paper mill is solved in accordance with the present invention by forming a useful precipitate which entrains the fines and thereafter supplying the precipitate to a paper making or other process for use therein.

According to the present invention there is provided a method for recovery and use of solids which are fines from a fines-containing aqueous stream in a paper mill in which a paper making or coating process is carried out, the stream containing material which has passed through but not been retained by the paper making or. coating process, which method includes at least one stage in which an alkaline earth metal carbonate is precipitated in the aqueous stream whereby particulate material present in the aqueous stream becomes entrained in the precipitate to form a mixed aggregated material and which includes the steps of recovering the mixed aggregated material and supplying the same for use as a particulate filler or coating pigment material in a paper making or coating process or for use as a particulate filler in another known application for particulate filler materials, eg. to form a polymer, eg. a thermoplastic composition incorporating the material. Where the mixed aggregated material is to be used as a filler material in one of the aforementioned applications it may optionally be mixed, together with other commercially available particulate filler material in the filler application. The re-use process where applied to paper making or coating may be carried out in the same mill as that producing the treated aqueous stream.

The alkaline earth metal carbonate preferably comprises calcium carbonate.

The particulate material present in the aqueous stream to be treated will generally consist predominantly of "fines", in other words that material which, according to TAPPI Standard No. T 261 cm-90, will pass through a round hole of diameter 76 μm. Such material conventionally obtained in a paper mill aqueous stream, eg. produced from one of the save alls, will comprise inorganic and organic particles and organic microfibres or microfibrils. Such material will contain significantly less than 1% by weight of fibres longer than 76 μm such fibres (substantially longer than 76 μm) comprising the treated raw fibres in the prior art processes described by Andersson et al and Hokuetsu as referred to hereinbefore.

DESCRIPTION OF THE INVENTION

Alkaline earth metal carbonates are known to precipitate in different crystal morphologies and, the aggregate solid material formed by precipitation in the method of the present invention may comprise any one or more of these morphologies. For example, precipitated calcium carbonate "pcc" is known to exist in the aragonite (aragonitic) form in which the crystals are needle shaped or in the calcite (calcitic) form. Various sub-classes of these two forms are referred to in the art. For example, reference is often made to two versions or 'habits' of the calcite form, viz rhombohedral in which the crystals have a rhomboid shape and scalenohedral in which the crystals have a kite shaped or double pyramid structure which favors twinning and growth of clusters. X-ray diffraction allows the aragonite and calcite forms to be distinguished and electron microscopy allows the rhombohedral and scalenohedral habits of the calcite form to be distinguished. Sometimes these two habits are subdivided further for classification purposes.

It is known to those familiar with the production and use of conventional pcc in paper making that generally scalenohedral pcc gives the best light scattering and therefore shows the best brightness when the pcc is used as a particulate filler or pigment material. However, aragonitic and rhombohedral pcc can also give acceptable scattering and brightness. By way of illustration, unfilled cellulose fibres typically used in paper making have a light scattering coefficient (known as the "Kubelka-Munk" coefficient or "s" herein referred to as 'scattering') of some 30 to 40 $m^2 kg^{-1}$. In contrast, conventional pcc has a much higher scattering typically in the range 100 $m^2 kg^{-1}$ to 300 $m^2 kg^{-1}$. All forms of pcc have scattering values usually in this range. Thus, whatever the form of pcc produced, the scattering of cellulose fibres to which the pcc is added will be considerably improved.

The brightness of a paper composition (or other medium) can be expressed as a function of both scattering and an absorption coefficient for a given light wavelength. Increases in scattering s can be used to determine improvements in brightness, especially in compositions of fixed or similar absorption coefficient.

As is known to those familiar with the art, the crystal form(s) obtained in the production of precipitated alkaline earth metal carbonates such as pcc depends upon a number of factors which have a complex relationship, such as the quantities and types of liquid, gaseous and solid species present, the temperature and, where the source of carbonate ions comprises $CO_2$ gas, the gas application rate. The result is that it is common to produce together a mixture of different crystal forms which usually include some scalenohedral crystals. Even to the trained eye, it may be difficult to distinguish between the different forms present, eg. as seen in an electromicrograph image of a given pcc sample. The aragonitic pcc habit is not frequently obtained by the reaction of $CO_2$ with slaked lime because its formation is known to require an unusual combination of conditions, viz temperature, gas application rate and lime concentration.

When the precipitated carbonate is formed as an aggregate together with fines in the method according to the present invention the variety of particles and microfibres present in the fines, which act as precipitation nucleation sites, will further cause variations on a microscopic scale in the precipitation process and the likelihood of forming a mixture of different crystal forms is enhanced as is illustrated in the specific examples described hereinafter. However, such mixtures, whatever their crystal form composition, are suitable for re-use in paper making or other processes. In paper making such mixtures will improve the scattering which in turn can improve the brightness of cellulose or other fibres employed in paper products. Such aggregates will also improve the scattering and brightness of other compositions, eg. polymers, to which they may be added as a filler material.

The extent of improvement obtained will depend upon the level of substitution of the base composition by loading of the aggregate material in the base composition. For example, for a cellulose fibre composition in which 20% by weight of the fibres are replaced by the aggregate precipitate and fines the scattering improvement will be about 20% of the difference between the scattering of the unfilled fibre composition and the scattering of the aggregate per se.

Use of the present invention to treat a fines-containing aqueous stream in a paper mill shows several important advantages as follows over the prior art processes in which fines are collected by the use of chemicals.

Firstly, the use of expensive chemicals can be avoided.

Secondly, the fines-containing water can if required be more efficiently and fully clarified making the clarified water more suitable for re-cycle and re-use in the paper mill.

Thirdly, the loss of fines from the mill can be reduced or eliminated by recovering the fines more efficiently and fully.

Fourthly, the fines-containing material which is recovered from the water stream does not have to be discarded. It can be used in various applications in which alkaline earth carbonates, eg. pcc, are known to be useful per se. For example, the aggregated precipitate and fines can be used in paper making, eg. as a particulate filler, and may beneficially be used in the paper making process in the paper mill in which the method according to the invention is being applied.

Fifthly, where the aggregated precipitate and fines is used as a filler in paper making by addition to cellulose fibres it provides various benefits as demonstrated herein including better retention than the fines per se with cellulose fibres when the fibres are being formed into sheets and also better scattering than the fibres per se. The aggregated precipitate and fines can also provide improved reduction of bursting strength (caused by addition of filler) and opacity in a paper making composition.

The aqueous suspension of the aggregate of precipitate and fines formed in the method of the present invention may be treated so as to separate partially or fully the aqueous host medium from the aggregate solids using one or more separation processes which may be known processes. For example, processes such as filtration, sedimentation, centrifugation or evaporation may be used. The separated aqueous medium, eg. water, may, optionally with further purification or clarification by one or more chemical, biochemical or mechanical processes which may be known per se, be recycled for reuse in the paper mill, eg. for use in diluting the paper making stock or for use as showers for washing machinery. The separated solids may be assessed for quality control by measurements taken on samples and subsequently delivered to a storage tank and thereafter supplied as necessary for use in a user application, eg. for use as a filler for making paper products, eg. in the paper mill in which the method according to the present invention is being applied or alternatively as a filler for other, eg. polymer compositions. The solids containing suspension may be re-diluted for use at the user plant.

It is not necessary for the aqueous suspension containing an aggregate of precipitate and fines formed by the method according to the present invention to be dewatered prior to supply for use in a user application, eg. re-use in the paper mill. The aqueous suspension or slurry may be delivered to a storage tank or directly to the user plant without substantial dewatering.

Where the product comprising an aggregate of precipitate and fines is to be re-used as a filler in a paper making composition, eg. in the mill in which the method according to the present invention is applied, the product may be supplied to the mill in one of various concentrations in water. The concentration may range from dilute suspension form to dry particulate solids. The product after formation in the method according to the present invention may or may not be treated as appropriate, eg. by dewatering or not, so that it may be delivered to the user plant, eg. paper making mill in the required concentration.

As demonstrated in the Examples hereinafter, the extent of dilution or concentration of the form in which the product is added to the paper making composition does not critically affect the properties of the resulting paper sheet. It may, however, for economic and practical reasons be more suitable to supply the product in the form of a concentrated pumpable aqueous slurry. Where the product is supplied for use in a process at another location it may be preferable to dry the product prior to transport. Where the product has been concentrated or dried prior to delivery and subsequently re-dispersed in or diluted with clean water prior to re-use, the concentration and dilution steps do not materially affect the usefulness of the product.

In any event, as will be clearly evident to those familiar with the paper making art, the product may be blended in various proportions with conventional filler materials, eg. precipitated or natural, eg. ground, calcium carbonate, kaolin and other clay, metakaolin, talc, calcium sulphate etc., the ingredients and composition as well as the host fibres being selected according to the quality of paper required to be produced. In general, these materials are likely to be in slurry form when they are mixed.

The paper maker will normally select the concentration of the aggregate material (produced in accordance with the present invention) in aqueous suspension and the delivery rate of the suspension at the point of addition to the paper making composition, eg. furnish. As noted above, this may require redilution of a suspension which has been delivered to the paper mill in concentrated form. Generally, the suspension added may contribute aggregate material which forms up to 30% by weight of the solids content of the paper making composition. Where other fillers, eg. also form part of the filler content of the paper making composition a total filler composition of up to 30% by weight of the solids content of the paper composition may be employed.

The aqueous suspension constituting the used water to be treated will generally contain not more than about 10% by weight of solid material fines) and preferably not less than about 0.1% by weight of solid material; such dilute suspensions of fines are normally difficult to separate into their solid and liquid components. Preferably, the suspension to be treated contains between 1% and 5% by weight solids, especially from 2% to 3% solids. Where the stream to be treated contains less than the appropriate level of solids it may be concentrated in a known way, eg. using dissolved air flotation. Similarly, the stream if concentrated initially may be diluted, eg. to a 2% solids level, if required, using clean water.

The treated suspension containing the precipitate of alkaline earth metal carbonate and entrained fine particulate material (or the separated solid material itself) may, as noted above, be reused, eg. by recycling to supplement the filler being used in the sheet forming process in the sheet forming mill. Alternatively, or in addition, water separated from the suspension containing the precipitate of alkaline earth metal carbonate and entrained fine particulate material may be reused in the sheet forming mill.

In the method of the present invention, the alkaline earth metal carbonate precipitate may be formed by introducing into the suspension constituting the used water to be treated a source of alkaline earth metal ions and a source of carbonate ions. Preferably this is carried out in a reaction vessel into which water from the stream to be treated, optionally after concentration or dilution as appropriate, is introduced. This will form the desired precipitate of alkaline earth metal carbonate in situ which will entrain the fine particles in the used water. The first reagent which is added is preferably uniformly distributed throughout the aqueous suspension to avoid local concentration gradients. When the first reagent is sparingly soluble, as is the case with calcium hydroxide, thorough mixing is desirable. It is also desirable that the suspension should be agitated while the second reagent is added in order to ensure an even distribution of the precipitate.

It is preferred to add the source of alkaline earth metal ions first followed by the source of carbonate ions. When the alkaline earth metal is calcium, this favors the precipitation of some crystals in the scalenohedral form of calcium carbonate, which form appears as noted above to give the best scattering when the aggregated product is to be re-used, eg. as a filler in the sheet forming process. As noted above, it is not essential however that the scalenohedral form is obtained and, where this form is produced, it is likely to be mixed with other form(s).

The source of alkaline earth metal ions is preferably and conveniently the alkaline earth metal hydroxide (known as milk of lime when the alkaline earth metal is calcium), but it may alternatively be a water-soluble alkaline earth metal salt, for example the chloride or nitrate. The alkaline earth metal hydroxide may be added already prepared to the aqueous suspension, or may be prepared in situ, for example by slaking an alkaline earth metal oxide (e.g. quicklime when the alkaline earth metal is calcium) in the suspension.

The source of carbonate ions is conveniently and preferably carbon dioxide gas which is introduced into the suspension containing the source of alkaline earth metal ions. The carbon dioxide gas may be substantially pure as supplied in gas cylinders or may be present as a mixture of gases such as flue or exhaust gases from a lime kiln or power plant. Alternatively, the source of carbonate ions may be an alkali metal carbonate or ammonium carbonate. Sodium carbonate is convenient on account of its relative cheapness and availability.

Whether the alkaline earth metal oxide is slaked in used water or in fresh water, the water may be at ambient temperature, but may be heated to a temperature in the range of from 30° C. to 70° C., and the suspension of the alkaline earth metal oxide in the water is preferably agitated vigorously for a time of up to 30 minutes to ensure that the slaking is complete.

When the alkaline earth metal is calcium and the source of carbonate ions is a carbon dioxide containing gas, the production of at least some crystals of calcium carbonate in the scalenohedral form is favoured by maintaining the temperature of the mixture of used water and calcium hydroxide in the range of from 20° C. to 65° C. The carbon dioxide containing gas preferably contains up to 100% $CO_2$ but may contain inert gas, eg. air or nitrogen, in addition to $CO_2$.

The quantity of the source of alkaline earth metal ions and of the source of carbonate ions used is preferably such as to precipitate sufficient alkaline earth metal carbonate to give a weight ratio of alkaline earth metal carbonate to fine particulate material in the range from 1:99 to 90:10, more preferably 10:90 to 90:10, especially 1:3 to 3:1.

Where the carbonate ion source comprises $CO_2$ and the alkaline earth metal source comprises slaked lime, the $CO_2$ is preferably added until the pH drops, eg. to a value of less than 9 preferably 7 to 8. The pH drop may be detected in a conventional manner using a known pH monitor.

The product suspension containing the precipitate of alkaline earth metal carbonate and entrained fine particulate material may, as noted above, be recycled directly in its relatively dilute form with little or no dewatering. It may be supplied, eg. to the paper making process, eg. to supplement the filler being used in the sheet forming process. Alternatively the suspension containing the precipitate may as noted above be concentrated by dewatering by any conventional method, for example by sedimentation, by vacuum evaporation or pressure filtration, or in a centrifuge. Optionally, the separated solids may be dried.

Where it is required to dewater, the suspension of the precipitate of alkaline earth metal carbonate and entrained fine particles formed as a product in the method according to the present invention is found to be very much easier to dewater than the original suspension of the fine particulate material alone. As an illustration, when a cake of the precipitate is formed by filtration or by centrifuging, the packing of the particles is such that the cake is very much more permeable to water than is a cake formed from the solid component of the used water alone. Also the precipitate, is found to have advantageous scattering which makes it suitable for use as a filler or, in some cases, as a coating composition ingredient in a paper making or coating process. The precipitate may also find use in other applications in which precipitated alkaline earth materials, eg. pcc, are known to be useful, eg. as a filler, for example, in polymeric compositions such as polyolefins and other thermoplastics materials, eg. for use as carpet backing compositions.

The stage in which an alkaline earth metal carbonate is precipitated in the used water in the method according to the present invention may conveniently follow or replace either the first save-all stage or the second save-all stage (of a conventional secondary circulation loop) of a sheet forming process in a paper mill. Alternatively the alkaline earth metal carbonate precipitation stage may take as its feed suspension the solids containing fraction delivered by the second save-all stage. Alternatively, the feed suspension may comprise the feed to the effluent treatment plant of the mill. The treated aqueous suspension may comprise water known as 'white water'.

According to another aspect of the present invention, there is provided a sheet cellulosic product comprising cellulose fibres and inorganic particulate filler, wherein at least a proportion of the inorganic particulate filler is a mixed or aggregated precipitate comprising an alkaline earth metal carbonate and fine solids separated from the used water recovery system of a sheet forming mill produced in the method according to the first aspect.

Embodiments of the present invention will now be described by way of example with reference to the accompanying drawings.

BRIEF DESCRIPTION OF THE DRAWINGS

With reference to the accompanying drawings in which.

DESCRIPTION OF THE PREFERRED EMBODIMENTS

Figure 1:
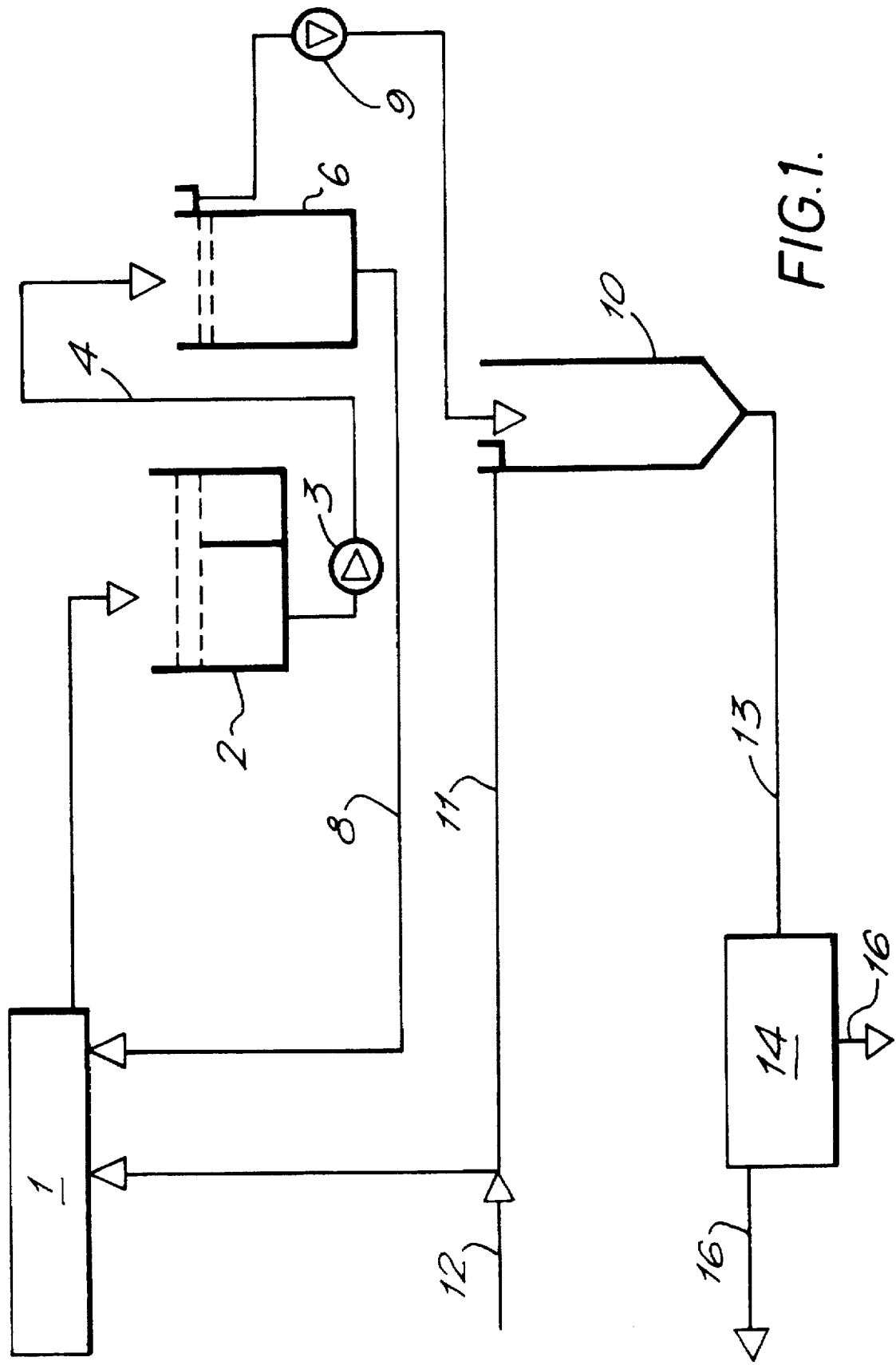
FIG. 1 is a flow diagram of a conventional secondary used water circulation system in a paper mill.

In FIG. 1, the reference numeral 1 represents the primary white water circulation system in a paper mill. An excess of used water passes through the wire of the paper making machine over that which can be returned as white water, and the excess used water overflows into a holding tank 2, whence it is transferred by means of a pump 3 and a conduit 4 to a first save-all 6, which may be, for example, of the sedimentation type. The solid particles which sink to the bottom of the save-all 6 are returned in aqueous suspension through a conduit 8 to the primary circulation system. Water of reduced fine solids content overflows from the lip of the first save-all 6, but is insufficiently free of suspended solids to be used in the showers of the paper making process. This dilute suspension of fine particles is transferred by means of a pump 9 from the overflow lip of the first save-all 6 to a second save-all 10, which may conveniently be of the type known as a clarifier which also operates on the sedimentation principle. Substantially clear water overflows from the second save-all 10 and is returned through a conduit 11 to the primary circulation system. If required, clean water from the mains may be introduced through a conduit 12 to make up any deficiency in the quantity of water which is returned. A thickened sludge of fine particulate material is withdrawn from the base of the second save-all through a conduit 13 to an effluent treatment plant 14, in which the sludge is dewatered, for example by filtration, to give a cake of waste solid material which may be discharged at 15 to a suitable landfill site, and water of sufficiently good quality to be suitable for discharge through a conduit 16 to a natural water course.

Figure 2:
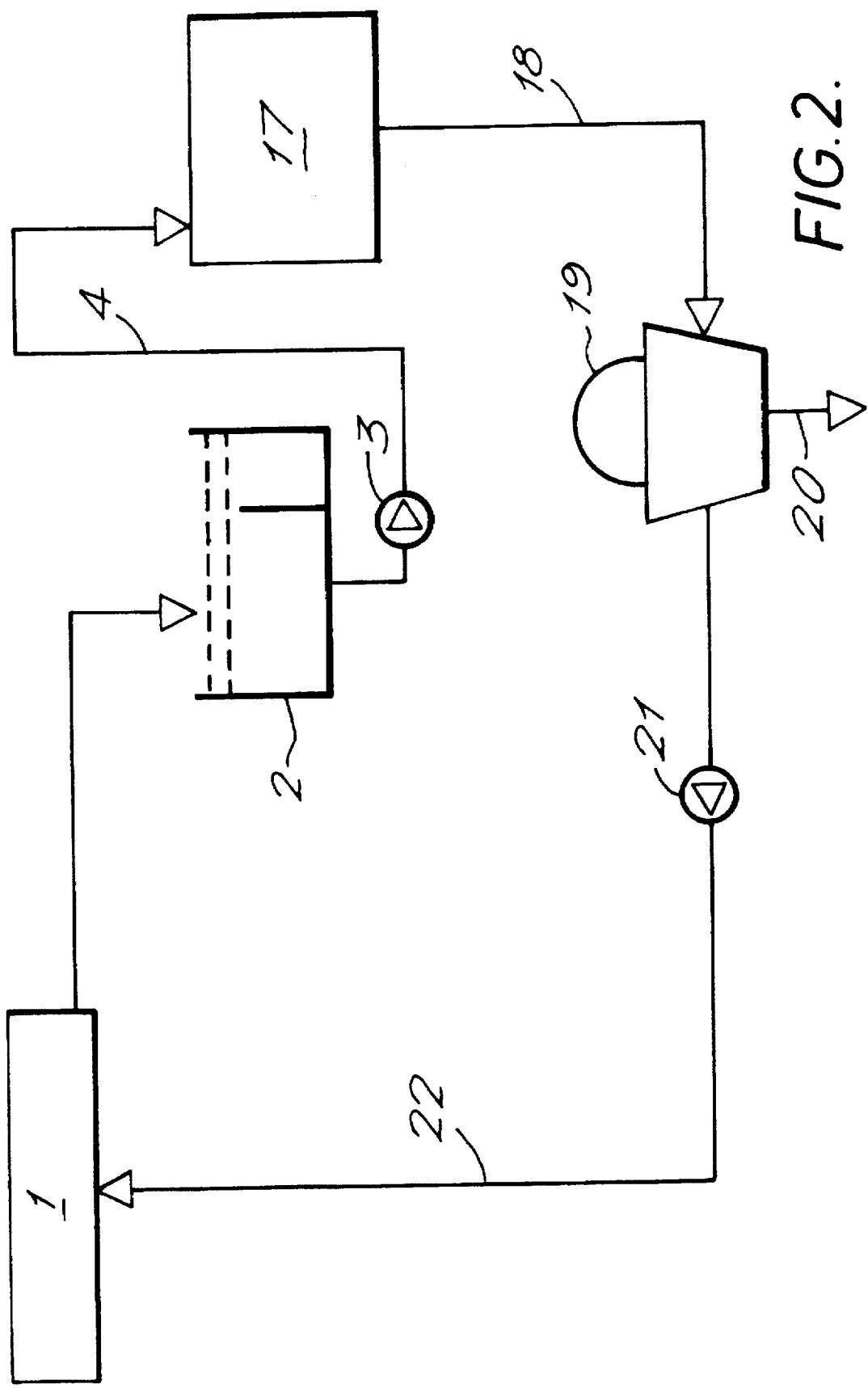
FIG. 2 is a flow diagram showing a first mode in which an embodiment of the process of the invention may be carried out.

FIG. 2 shows a secondary used water circulation system in which the first save-all 6 as shown in FIG. 1 is replaced with a plant 17 in which, in accordance with an embodiment of the invention, an alkaline earth metal carbonate is precipitated in the aqueous suspension constituting the used water whereby the particulate material present in the used water becomes entrained in the alkaline earth metal carbonate precipitate. The mixture of aggregated solid material and water which is the product of the plant 17 passes through a conduit 18 to a dewatering device 19, which may conveniently be a vacuum disc filter. A concentrated suspension of the aggregated solid material is withdrawn at 20 and may be transported to the stock preparation plant of the paper mill for incorporation as a filler, together with conventional filler, eg. kaolin and/or conventional pcc, in the paper mill stock, or may be used for some other purpose, eg. for drying and transport for use as a filler for the thermoplastic compositions. Substantially clear water is returned by means of a pump 21 through a conduit 22 to the primary circulation system.

Figure 3:
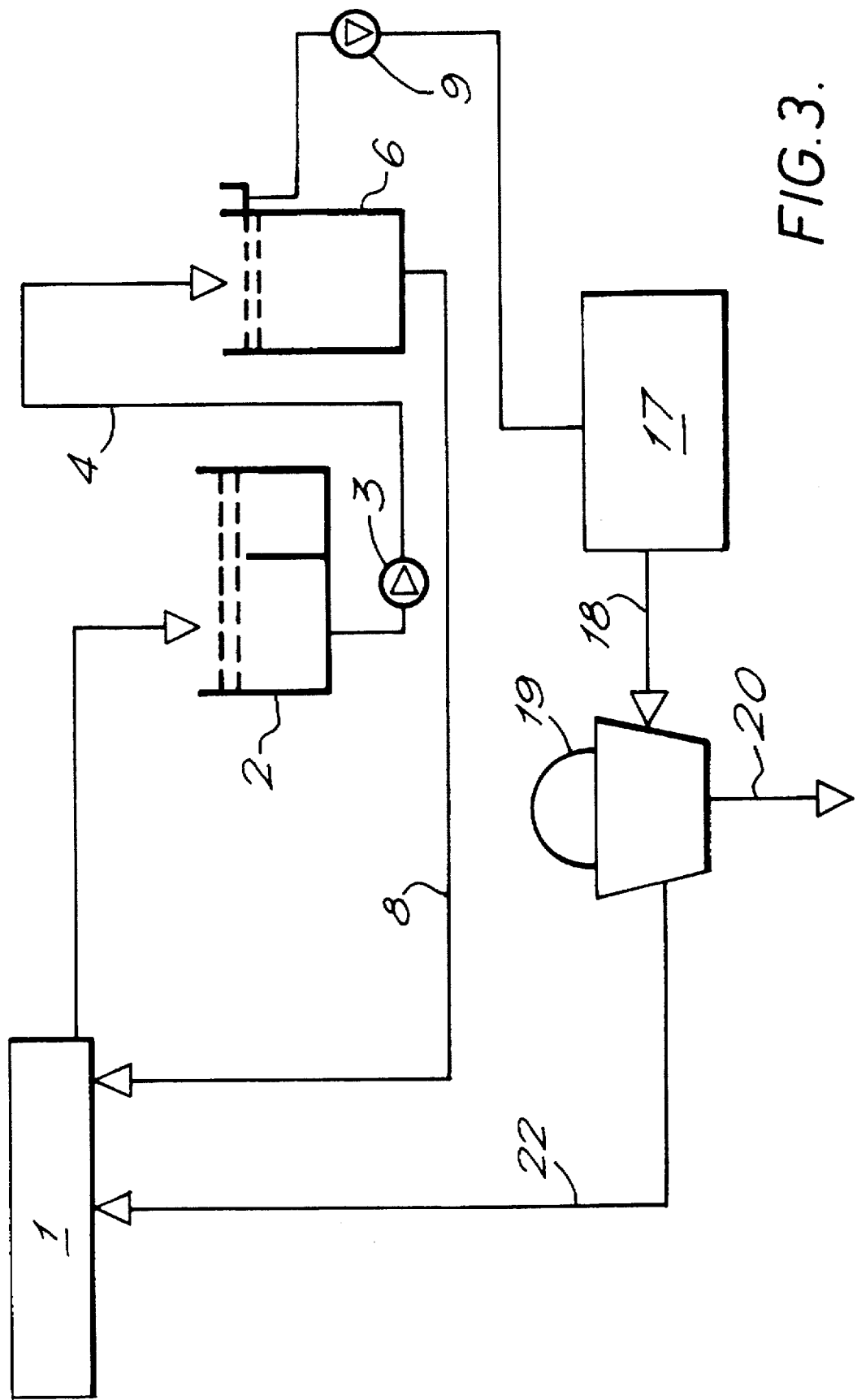
FIG. 3 is a flow diagram showing a second mode in which an embodiment of the process of the invention may be carried out.

FIG. 3 shows a secondary used water circulation system in which the second save-all is replaced with a plant 17 in which, in accordance with the invention, an alkaline earth metal carbonate is precipitated in the aqueous suspension constituting the used water. The mixture of aggregated solid material and water produced by the plant 17 passes through a conduit 18 to a vacuum disc filter 19. A concentrated suspension of the aggregated solid material is formed and discharged at 20 for use as a filler in the paper mill stock, or for some other purpose as described above. Substantially clear water is returned through a conduit 22 to the primary circulation system.

Figure 4:
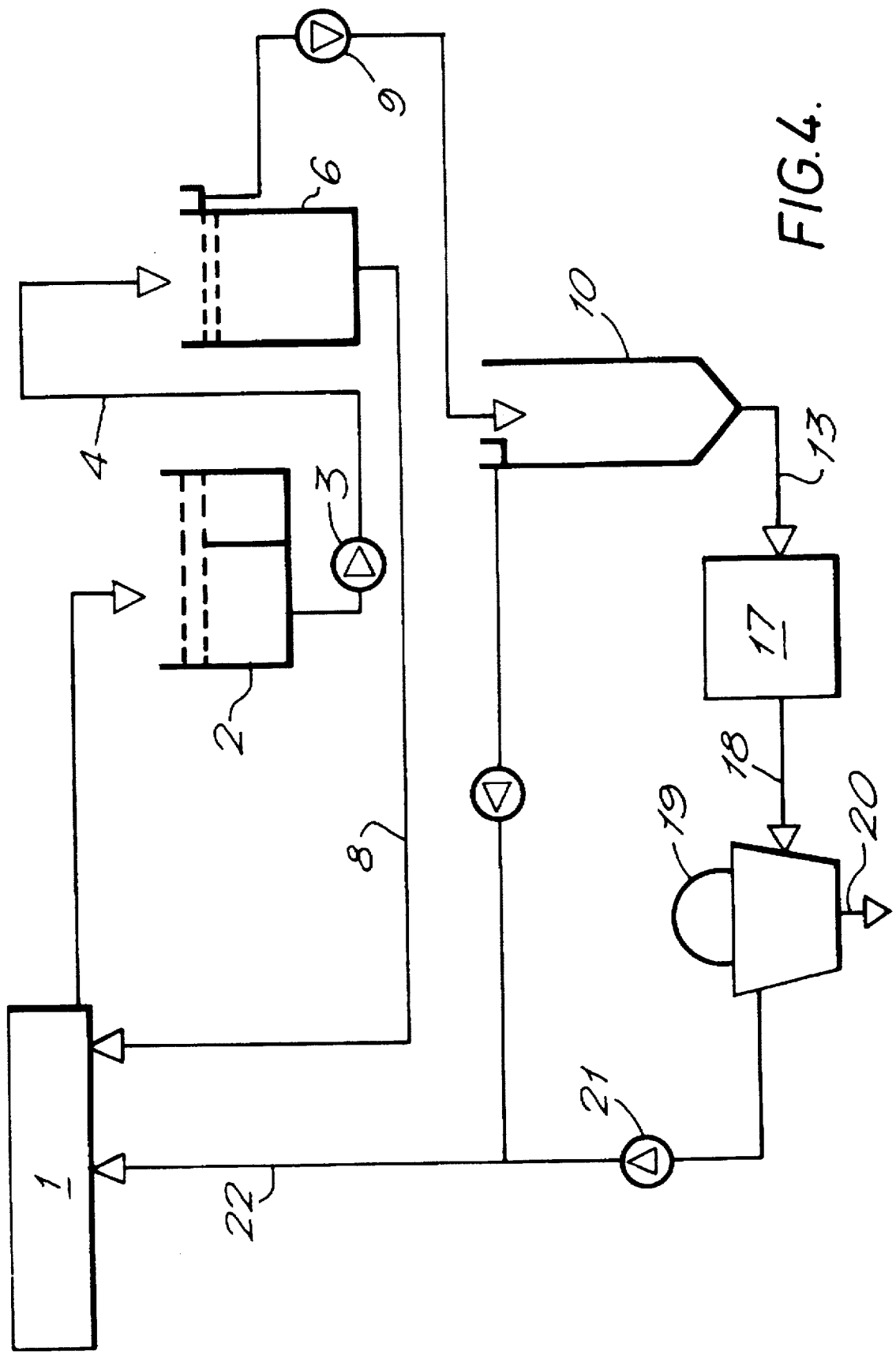
FIG. 4 is a flow diagram showing a third mode in which the process of the invention may be carried out.

FIG. 4 shows a secondary used water circulation system in which a plant 17 where, in accordance with the invention, an alkaline earth metal carbonate is precipitated in the aqueous suspension, is used to treat the solids sludge which is produced by the second save-all 10. The sludge passes to the plant 17 through a conduit 13, while substantially clear water is transferred by means of a pump 23 through a conduit 11 to the primary circulation system. The mixture of aggregated solid material and water produced by the plant 17 passes through a conduit 18 to a vacuum disc filter 19. A cake of the aggregated solid material is formed and discharged at 20 for use as a filler in the paper mill stock, or for some other purpose. Substantially clear water is returned by means of a pump 21 through a conduit 22 to the primary circulation system.

As an alternative to the embodiments illustrated in FIGS. 2 to 4, the product aqueous suspension formed in each case in plant 17 may be delivered without dewatering to the process in which it is to be re-used.

The invention is also illustrated by the following examples.

EXAMPLE 1

The used white water entering the secondary circulation system of a paper mill was found to contain 0.27% by weight of suspended solids which were predominantly organic fines, but also contained a smaller proportion of fines which were inorganic filler particles. The first save-all of the secondary circulation system was replaced, in the manner shown in FIG. 2, with a plant (reaction vessel) in which the temperature of the used water was raised to 45° C., and there was added thereto 56 g of quicklime per liter of used water. The resultant mixture was vigorously stirred until the slaking of the quicklime was complete. A gas containing 25% by volume of carbon dioxide, the remainder being air, was then admitted into the mixture, the temperature of the mixture being maintained at 45° C., at a rate sufficient to convert all the calcium hydroxide present into calcium carbonate. An aggregated crystalline precipitate was formed, and a sample of the aqueous suspension of this product, which resulted from the carbonation of the mixture of used water and hydrated lime, was tested for filtration rate by the method described in Appendix 1 below and was found to give a result of 6.1 units. By comparison, the filtration rate of the used water entering the secondary circulation system was found to be 0.0176 units. The method embodying the invention was therefore found to increase the rate of filtration of the used white water by a factor of nearly 350.

The suspension of the aggregated precipitate was dewatered by means of a vacuum disc filter and the water separated in this way was found to be crystal clear with no detectable turbidity. Also the cake of the aggregated crystalline material was dried and was examined under a scanning electron microscope. It was found to consist of fine precipitated calcium carbonate aggregated with, ie. bonded to, the fines comprising particles and microfibres which were originally present in the used water.

EXAMPLE 2

The used white water entering the secondary circulation system of a paper mill was found to contain 0.3% by weight of fine solid material, 80% by weight of which consisted of organic fines, the remainder being fine calcium carbonate filler particles. The first save-all of the secondary circulation system was replaced, in the manner shown in FIG. 2, with a plant in which there was added to the used water at ambient temperature 134 ml of an aqueous suspension of hydrated lime (calcium hydroxide) per liter of used water. The suspension of hydrated lime was prepared by slaking 112 g of quicklime in 1 liter of water at 50° C. with vigorous agitation for 25 minutes. Assuming that the quicklime is completely slaked, each liter of the suspension prepared in this way will contain 148 g of calcium hydroxide. The weight of calcium hydroxide added per liter of used water was therefore 19.8 g. A gas containing 25% by volume of carbon dioxide, the remainder being air, was then admitted into the mixture, the temperature of the mixture being maintained at 45° C., at a rate sufficient to convert all the calcium hydroxide present into calcium carbonate. An aggregated crystalline precipitate was formed, and a sample of the aqueous suspension of this product, which resulted from the carbonation of the mixture of used water and hydrated lime, was tested for filtration rate by the method described in Appendix 1 below and was found to give a result of 2.43 units. By comparison, the filtration rate of the used water entering the secondary circulation system was found to be 0.0048 units. The method in accordance with an embodiment of the invention was therefore found to increase the rate of filtration of the used white water by a factor of over 500.

The suspension of the aggregated precipitate was dewatered by means of a vacuum disc filter and the water separated in this way was found to be crystal clear with no detectable turbidity. Also the cake of the aggregated crystalline material was dried and was examined under a scanning electron microscope. It was found to consist of fine precipitated calcium carbonate aggregated with, ie. bonded to, the fines comprising particles and microfibres which were originally present in the used water. This aggregated material was found to be very suitable for incorporation into the paper making stock as a filler optionally together with conventional filler, eg. conventional pcc.

EXAMPLE 3

A sample of used water from the effluent treatment plant (14 in FIG. 1) of a paper mill in Kent, England making woodfree paper contained 2.3% by weight of fine solid material which consisted of 29% by weight of inorganic fines and 71% by weight of organic fines. The brightness of the solid material in the waste water was determined by filtering the water on a Whatman No. 40 filter paper, drying the resultant cake in an oven, conditioning the dried cake for at least 15 hours at 23° C. and 50% relative humidity, and measuring the reflectance of the cake to light of wavelength 457 nm by the method prescribed in I.S.O. Standard No. 2470. The filtration rate of the waste water and the weight fraction of solids in the filter cake formed were determined by the method described in Appendix 1.

There was then added to the waste water at ambient temperature sufficient of a suspension containing 148 g of calcium hydroxide per liter to provide 17.0 g of calcium hydroxide per liter of waste water. This was the amount of calcium hydroxide which was calculated to give, after carbonation with carbon dioxide-containing gas, a weight of calcium carbonate per liter of waste water which was equal to the weight per liter of fine solid material. The suspension of calcium hydroxide was prepared as described in Example 2. A gas containing 20% by volume of carbon dioxide, the remainder being air, was then admitted into the mixture of waste water and calcium hydroxide, the temperature of the mixture being maintained at 50° C., at a rate sufficient to supply 0.048 moles of carbon dioxide per minute per mole of calcium hydroxide. The gas was passed through the mixture until the pH of the mixture fell to 7.0 which corresponded to a time of 21 minutes. An aggregated crystalline precipitate and fines was formed, and samples of the aqueous suspension of this product, which resulted from the carbonation of the mixture of used water and calcium hydroxide, were tested for brightness of the solid material, filtration rate and the weight fraction of solids in the filter cake by the methods described above.

The results are set forth in Table 1 below:

TABLE 1

|  | Brightness of solid material | Filtration rate | wt. % solids in cake |
|---|---|---|---|
| Before treatment | 61.5 | 0.037 | 13.1 |
| After treatment | 83.0 | 1.030 | 46.5 |

These results show improvement in the brightness and filtration rate of the suspended solid material obtained by use of the method embodying the present invention.

The water separated from the aggregated precipitate by filtration was found to be crystal clear with no detectable turbidity.

Hand sheets of paper filled with the aggregated crystalline precipitate and fines obtained as described above were prepared in the following way. 400 g of bleached sulphite spruce pulp were soaked in 10 liters of filtered water for 4 hours and the mixture was then disintegrated for 10 minutes in a turbine mixer, the impeller rotating at a speed of 1500 rpm. The contents of the mixer were washed out with a further 10 liters of water and transferred to a laboratory beater where a further 2 liters of water was added and the mixture beaten for 16.5 minutes. At this stage the stock contained approximately 1.8% by weight of dry pulp. The beating time was chosen to give the optimum compromise between brightness and strength properties of the stock which corresponds to a Canadian Standard Freeness of 300. 800 ml of the stock was then made up to 2 liters with water and disintegrated in a laboratory disintegrator which was operated for 15,000 revolutions of the impeller. The volume of stock was made up to 4 liters with filtered water and the consistency was checked by forming a paper sheet from a small sample by draining on a suitable wire screen and drying and weighing the sheet thus formed. Water was added if necessary to reduce the consistency to 0.3% by weight of dry pulp.

There was then added to the paper making stock thus formed and stirred in by hand as filler sufficient of an aqueous suspension of the aggregated crystalline precipitate and fines to provide 20% by dry weight of the total solid material in the paper making stock.

Hand sheets were prepared from the filler-containing paper making stock according to the procedure laid down in TAPPI Standard No. T205 om-88, "Forming handsheets for physical tests of pulp". For each hand sheet 400 ml of the stock was poured into the sheet forming machine and surplus water was removed.

The brightness, or percentage reflectance to violet light of the paper formed from each of the three portions of stock was measured by means of a DATACOLOR 2000 brightness meter fitted with a No. 8 filter (457 nm wavelength).

The opacity of each sample of paper was measured by means of the DATACOLOR 2000 brightness meter fitted with a No. 10 filter (a green filter embracing a broad spectrum of wavelengths). A measurement of the percentage of the incident light reflected was made with a stack of ten sheets of paper over the black cavity ($R_{\infty}$). The ten sheets were then replaced with the single sheet from the top of the stack over the black cavity and a further measurement of the percentage reflectance was made (R). The percentage opacity was calculated from the formula:

Percentage opacity=100·R/$R_{\infty}$

The procedure was performed a total of ten times with each time a different sheet of paper on the top of the stack, and the average value of the percentage opacity was determined.

The hand sheets from each batch were also tested for bursting strength by the test prescribed in TAPPI Standard No. T403 om-85. The bursting strength is defined as the hydrostatic pressure in kilopascals required to produce rupture of the material when the pressure is increased at a controlled constant rate through a rubber diaphragm to a circular area of the paper 30.5 mm in diameter. The area of the material under test is initially flat and held rigidly at the circumference but is free to bulge during the test. Samples of each sheet were also weighed dry, the weight of the dry sample being used to determine the weight per unit area of the paper in grams per square meter. The burst strengths were divided by the weight per unit area of the paper to give a burst index.

As a comparison, the experiment described above was repeated, but using as the filler in the paper making composition 20% by weight of a commercially available precipitated calcium carbonate filler having a particle size distribution such that the weight median particle diameter was 3.0 μm.

As a further comparison, hand sheets were prepared from paper making stock which contained no filler and subjected to the same tests as are described above.

The results are set forth in Table 2 below. For the hand sheets prepared from stock containing filler, a burst ratio was calculated as the burst index expressed as a percentage of the value of burst index obtained for the unfilled hand sheets.

TABLE 2

|  | Brightness % | Opacity % | Burst ratio* |
| --- | --- | --- | --- |
| Unfilled | 83.4 | 72.0 | 100 |
| Precipitated calcium carbonate filler | 88.7 | 86.3 | 33 |
| Aggregated precipitate and fines filler | 85.7 | 81.5 | 65 |

*% of value for unfilled sheet

These results show that the brightness and opacity values achieved when the aggregated precipitate and fines is used as the filler are an improvement on those exhibited by the unfilled sheets. Also, the aggregated material causes a much smaller reduction in the strength of the paper than the proprietary filler. Thus, the aggregate precipitated material produced by the method embodying the present invention provides a useful alternative or supplement to the proprietary filler for use in filling a paper composition.

EXAMPLE 4

The following samples of waste water were taken from different paper mills:

Sample A: from the overflow of the first save-all (save all 6 in FIG. 1) of a paper mill in Scotland making woodfree paper. The waste water contained 0.37% by weight of fine solid material which consisted of 66% by weight of inorganic fines and 34% by weight of organic fines.

Sample B: from the coating plant of another paper mill in Scotland. The waste water contained 2.9% by weight of fine solid material which consisted of 86% by weight of inorganic fines and 14% by weight of organic fines. The fine solid material was in a deflocculated condition.

Sample C: from the feed to the effluent treatment plant (14 in FIG. 1) of a paper mill in Sweden making newsprint. The waste water contained 0.48% by weight of fine solid material which consisted of 17% by weight of inorganic fines and 83% by weight of organic fines.

Sample D: from the feed to the effluent treatment plant (14 in FIG. 1) of another paper mill in Sweden making newsprint. The waste water contained 0.78% by weight of fine solid material which consisted of 41% by weight of inorganic fines and 59% by weight of organic fines.

There was added to each sample of waste water at ambient temperature sufficient of a suspension containing 148 g of calcium hydroxide per liter to provide, after carbonation with a carbon dioxide-containing gas, a weight of calcium carbonate equal to the weight of fine solid material in the sample. For example, in the case of Sample A, which contained 0.37% by weight of fine solid material, there was added sufficient of the calcium hydroxide suspension to provide 2.7 g of calcium hydroxide per liter of sample. A gas containing 20% by volume of carbon dioxide, the remainder being air, was then admitted into the mixture of waste water and calcium hydroxide, the temperature of the mixture being maintained at 50° C., at a rate sufficient, in the case of Sample A, to supply 0.11 moles of carbon dioxide per minute per mole of calcium hydroxide, and, in the case of Samples B to D, to supply 0.048 moles of carbon dioxide per minute per mole of calcium hydroxide. The gas was passed through the mixture until the pH of the mixture fell to 7.0 which corresponded to a time of 9 minutes in the case of Sample A, and about 20 minutes in the case of Samples B to D. An aggregated material consisting of crystalline precipitate and fines was formed, and samples of the aqueous suspension of this product, which resulted from the carbonation of the mixture of used water and calcium hydroxide, and samples of the waste water before the addition of the calcium hydroxide, were tested for brightness of the solid material, filtration rate and the weight fraction of solids in the filter cake by the methods described in Example 3 above. The turbidity of each sample of waste water before and after treatment with calcium hydroxide and carbon dioxide-containing gas was also determined. The results are set forth in Table 3 below:

TABLE 3

| Sample | Brightness of solid material | | Filtration rate | | % by weight solids in cake | | Turbidity | |
|---|---|---|---|---|---|---|---|---|
| | before | after | before | after | before | after | before | after |
| A | 76.7 | 87.1 | 0.003 | 0.440 | 32.4 | 34.0 | 1.9 | 0 |
| B | 66.9 | 86.7 | * | 0.830 | * | 45.4 | * | 1.5 |
| C | 34.3 | 54.4 | 0.004 | 0.310 | 42.9 | 36.3 | 76.5 | 19.6 |
| D | 33.4 | 49.4 | 0.007 | 0.480 | 39.0 | 39.0 | 100.0 | 20.4 |

Note: * indicates that the sample was deflocculated and therefore no meaningful measurement could be made.

In each case, the treatment in accordance with the method embodying the invention effected a substantial improvement in the brightness of the solid material in suspension, the filtration rate and turbidity of the suspension. There was little change in the weight fraction of solids in the filter cake. In fact, in the case of sample C, there was a small decrease in the weight fraction of solids after the treatment.

Hand sheets were prepared by the procedure described in Example 3 above, using as the filler in the stock composition 20% by weight of the aggregated crystalline precipitate and fines obtained by treating each of Samples A to D with calcium hydroxide and carbon dioxide-containing gas in accordance with the method embodying the invention. The hand sheets were tested for opacity and burst ratio as described above. In addition, the scattering coefficient of the sheets was measured in the following manner.

Samples of the paper formed from each of the three portions of stock were dried and weighed to give the weight per unit area W, and tested for percentage reflectance to light when placed over a black background by means of a DATACOLOR 2000 brightness meter fitted with a No. 10 filter (a green filter embracing a broad spectrum of wavelengths) to give the reflectance $R_0$.

The percentage reflectance to light of the top surface of a stack of ten sheets of paper was determined by means of the DATACOLOR 2000 brightness meter fitted with a No. 10 filter to give the reflectance $R_\infty$. The top five sheets were of the paper currently under test, and the bottom five sheets were taken from other samples of paper of similar opacity, for the purpose of ensuring that the stack of paper was completely opaque.

The scattering coefficient S for each batch of paper was calculated from the formulae:

$$a=0.5[1/R_\infty+R_\infty]$$

$$b=0.5[1/R_\infty-R_\infty]$$

$$X=[1-aR_0]/[bR_0]$$

$$SW=(0.5/b)ln[(X+1)/(X-1)]$$

As a comparison, hand sheets were also prepared using as the filler 20% by weight (in the stock composition) of a ground natural chalk filler having a particle size distribution such that 45% by weight consisted of particles having an equivalent spherical diameter smaller than 2 μm. The hand sheets were subjected to the same scattering, opacity and burst strength tests as described above.

As a further comparison, hand sheets were prepared from paper making stock which contained no filler and subjected to the same tests as are described above.

The results are set forth in Table 4 below:

TABLE 4

| | Scattering m$^2$kg$^{-1}$ | Opacity % | Burst ratio* |
|---|---|---|---|
| Unfilled | 27 | 73.2 | 100 |
| Natural chalk filler | 41 | 82.0 | 47 |
| Sample A | 48 | 83.0 | 66 |
| Sample B | 57 | 85.0 | 48 |
| Sample C | 51 | 92.5 | 58 |
| Sample D | 40 | 94.0 | 63 |

*% of value for unfilled sheet

In each case the aggregated crystalline precipitate prepared in accordance with the method embodying the invention gave hand sheets of superior opacity to those prepared using ground natural chalk as the filler and in all cases the scattering was improved. The aggregated precipitate and fines prepared from Samples A, B and C gave sheets of superior scattering to those prepared using chalk as the filler. In all cases the aggregated precipitate and fines caused less reduction in the strength of the sheets than the natural chalk filler.

EXAMPLE 5

The aggregated precipitate and fines which were formed by carbonating with gaseous carbon dioxide mixtures of used water Samples C and D with calcium hydroxide, as described in Example 4, were incorporated as fillers into sheets formed from a typical neutral mechanical pulp composition in the following manner.

400 g of a chemithermal mechanical softwood pulp was soaked in 10 liters of filtered water for 4 hours and the mixture was then disintegrated for 10 minutes in a turbine mixer, the impeller rotating at a speed of 1500 rpm. At this stage the stock contained approximately 3.8% by weight of dry pulp and the pH of the stock was approximately 7.0. 350 ml of this stock was then made up to 2 liters with filtered water and disintegrated in a British Standard laboratory disintegrator which was operated for 15,000 revolutions of the impeller. The volume of stock was made up to 4 liters with filtered water and the consistency was checked by forming a paper sheet from a small sample by draining on a suitable wire screen and drying and weighing the sheet thus formed. Water was added if necessary to reduce the consistency to 0.3% by dry weight of pulp. The Canadian Standard Freeness of the stock at this stage was in the range from 160 to 180.

There was then added to the paper making stock thus formed, and stirred in by hand, sufficient of an aqueous suspension of the aggregated material consisting of crystalline precipitate and fines to provide either 2% or 4% by dry weight of the total solid material in the paper making stock.

Hand sheets were prepared from the filler-containing paper making stock according to the procedure laid down in TAPPI Standard No. T205 om-88. For each hand sheet 400 ml of the stock was poured into the sheet forming machine and surplus water was removed.

The hand sheets were then conditioned for 16 hours at 23° C. and 50% relative humidity, and were then subjected to supercalendering in a laboratory supercalender for three passes at room temperature, at a speed of 25 m.min$^{-1}$ and at a force of 5 kN (15.4 kg per linear cm.).

The hand sheets were then tested for scattering, opacity and bursting strength by the procedures described in the earlier Examples.

As a comparison, the experiment described above in this Example 5 was repeated, but using as the filler in the neutral mechanical pulp composition 2% by weight of a calcined kaolin clay having a particle size distribution such that 91% by weight consisted of particles having an equivalent spherical diameter smaller than 2 µm. Mechanical pulps are commonly acidic in nature, and this calcined kaolin represents a high-cost, high performance filler which is suitable for use in such a composition.

As a further comparison, the experiment described above in this Example 5 was repeated, but using as the filler in the neutral mechanical pulp composition 2% by weight of a precipitated calcium carbonate having a particle size distribution such that the weight median particle diameter was 3.0 µm. This is an example of a high-performance filler which may be used in a mechanical pulp composition when the pH of the system is neutral or alkaline.

As a further comparison, hand sheets were prepared from paper making stock which contained no filler and subjected to the same tests as are described earlier in this Example 5.

The results are set forth in Table 5 below. For the hand sheets prepared from stock containing filler, the burst ratio was expressed as a percentage of the value obtained for the unfilled hand sheets.

TABLE 5

| Filler | Amount | Scattering m$^2$kg$^{-1}$ | Opacity % | Burst ratio* |
|---|---|---|---|---|
| Unfilled | | 43 | 87.6 | 100 |
| Calcined clay | 2% | 50 | 89.1 | 79 |
| Pptd. calcium carbonate | 2% | 49 | 88.3 | 68 |
| Sample C | 2% | 47 | 90.4 | 91 |
| Sample C | 4% | 49 | 91.1 | 83 |
| Sample D | 2% | 44 | 90.4 | 91 |
| Sample D | 4% | 44 | 90.9 | 85 |

*% of value for unfilled sheet

These results show that, the scattering of the paper using as the filler the aggregated materials produced by the method embodying the invention is generally improved, and also that the opacity is improved and that the reduction in strength of the resultant paper is improved when compared with the paper containing only the conventional fillers. The improvements in each case are small because the amounts of aggregate material applied to the pulp composition are small.

EXAMPLE 6

A fines containing stream from a process for use of pulp for making newsprint consisted of an aqueous suspension containing between 4% and 9% by dry weight of solids fines which comprised approximately 60% by weight of inorganic particles and 40% by weight of organic fines.

A sample of the aqueous suspension was diluted with water to a solids content of about 2% by dry weight. The temperature of the sample was raised to 30° C. and there was added to the sample sufficient of a suspension containing 148 g of calcium hydroxide per liter to provide, after carbonation with carbon dioxide gas, a weight of calcium carbonate equal to the weight of fine dry solid material in the sample. In other words, there was added sufficient of the calcium hydroxide suspension to provide 14.8 g of calcium hydroxide per liter of the sample. Carbon dioxide gas was then admitted into the mixture of the aqueous suspension and calcium hydroxide, the temperature of the mixture being maintained at 50° C., at a rate sufficient to supply 0.048 moles of carbon dioxide per minute per mole of calcium hydroxide.

The gas was passed through the mixture until the pH fell to 7.0 which corresponded to a time of about 20 minutes. An aggregated material consisting of a crystalline precipitate and fines was formed, and samples of the aqueous suspension of this product (Suspension A), which resulted from the carbonation of the mixture of the original suspension and calcium hydroxide, and which contained 3.8% by dry weight of solids, were tested for filtration rate and the filtrate obtained in the filtration test was tested for turbidity. Samples of the original aqueous suspension before treatment were tested in the same way.

A further sample of the aqueous suspension of the product obtained from the carbonation step was allowed to settle under gravity, and a layer of substantially clear water which formed on top of the suspension was removed. The remaining thickened suspension was found to contain 8.5% by dry weight of solids. Samples of this thickened suspension (Suspension B) were tested for filtration rate and the filtrate obtained in the filtration test was tested for turbidity.

A yet further sample of the aqueous suspension of the aggregate product obtained from the carbonation step was filtered to form a cake containing 32.8% by dry weight of solids. Samples of this suspension (Suspension C) were tested for filtration rate and the filtrate obtained in the filtration test was tested for turbidity.

The results are set forth in Table 6 below:

TABLE 6

| Suspension | Filtration Rate | Turbidity |
|---|---|---|
| Untreated Suspension | 0.028 | 38.8 |
| Suspension A | 0.63 | 16.1 |
| Suspension B | 0.62 | 11.3 |
| Suspension C | 0.29 | 4.3 |

The filtration rate was measured by the procedure which is described in Appendix 1 of European Patent Application No. 94304437.0.

The turbidity was measured by a light transmission method using deionised water as a standard. The result is expressed in FTU.

These results show that, within the limits of experimental error, the filtration rate and filtrate turbidity for Suspensions A, B and C are improved compared with the original suspension. The values obtained are the same for Suspensions A and B. The filtration rate for Suspension C is slightly inferior, and the filtration turbidity slightly superior, as compared with the results for Suspensions A and B. However, the procedure followed in the preparation of Suspension C has the economic advantage that the formation of a concentrated form of the aqueous suspension containing the aggregated precipitate, eg. a cake formed by filtration greatly reduces the weight ratio of water to solids in the recovered material. This means that if the recovered material is to be stored or transported over long distances, the total weight, and the volume, of the material per unit dry weight of solids, is considerably reduced, which, in turn, reduces the capital cost of providing suitable storage or transport containers. For example, the cake produced in preparing Suspension C contains 2.0 parts by weight of water per part by dry weight of solids, whereas Suspension A contains 25 parts by weight of water per part by weight of dry solids, and Suspension B contains 11 parts by weight of water per part by weight of dry solids. The concentrated or dried material may be re-dispersed prior to use.

Hand sheets of paper filled with the aggregated crystalline precipitate obtained as described above were prepared in the following way. The concentrated Suspension C was first redispersed in clean water to form a suspension (Suspension 1) which contained 7.5% solids by dry weight. In the preparation of each batch of paper making stock, 2 liters of a suspension of a thermomechanical pulp containing 3.56% by weight of dry pulp was diluted to 10 liters with filtered water and was then disintegrated for 10 minutes in a turbine mixer, the impeller rotating at a speed of 1500 rpm. At this stage the stock contained approximately 0.7% by weight of dry pulp and the Canadian Standard Freeness was 130. The volume of stock was made up to 20 liters with filtered water and the consistency was checked by forming a paper sheet from a small sample by draining on a suitable wire screen and drying and weighing the sheet thus formed. Water was added if necessary to reduce the consistency to 0.3% by weight of dry pulp.

There were then added to the batches of paper making stock thus formed and stirred in by hand sufficient of an aqueous suspension of the aggregated crystalline precipitate and fines, ie. either Suspension A, B or C1, to provide amounts between 15% and 25% by weight of the total dry solid material in the paper making stock. This was followed in each case by the addition of 0.02% by weight, based on the total weight of dry solid material in the stock, of a retention aid.

Hand sheets were prepared from the batches of filler-containing paper making stock according to the procedure laid down in TAPPI Standard No. T205 om-88, "Forming handsheets for physical tests of pulp". For each hand sheet a sample of the stock was poured into the sheet forming machine and surplus water was removed.

The scattering, opacity and bursting strength of the hand sheets was measured in the manner described hereinbefore.

The filler content of each batch was determined by incinerating a sample of the handsheets prepared from that batch. The weight of the ash residue was determined and expressed as a percentage of the total weight of the sample of handsheets. From this percentage, and from a knowledge of the weight ratio of inorganic to organic material in the solid component of the original froth product, the percentage by weight of filler in the handsheets was determined. For each batch, each of the measured properties was plotted graphically against the percentage by weight of filler, and the value of the property which corresponded to a filler content of 20% by weight was determined by interpolation.

As a comparison, hand sheets were prepared from paper making stock which contained no filler and subjected to the same tests as are described in this Example 6 above.

The results are set forth in Table 7 below. For the hand sheets prepared from stock containing filler, the burst ratio was expressed as a percentage of the value obtained for the unfilled hand sheets.

TABLE 7

| Filler | Scattering $m^2kg^{-1}$ | Opacity (%) | Burst ratio (% of value for unfilled sheet) |
|---|---|---|---|
| Unfilled | 24.8 | 68.8 | 100 |
| Suspension A | 51 | 90.5 | 62 |
| Suspension B | 51 | 90.5 | 62 |
| Suspension C1 | 51 | 90.5 | 58 |

These results show that, within the limits of experimental error, the scattering, opacity and burst ratio are the same for each of the fillers provided by Suspensions A, B and C1. Thus, the extent of concentration or dilution which has been applied to a suspension of the aggregated precipitate formed in the method according to the present invention does not critically affect the properties shown in Table 7 of a sheet composition using the aggregated precipitate as a filler material. Of course, as illustrated in the case of Suspensions C and C1, where a suspension has been concentrated it is desirable to redilute it before use (eg. at the paper making plant) to a standard concentration as applied by the paper maker.

EXAMPLE 7

The experiment described in Example 6 was repeated except that the original aqueous suspension in each case was diluted with water to a solids content of 1.8% by dry weight. The temperature of the sample was raised to 30° C. before the calcium hydroxide was added, and was maintained at 50° C. during the carbonation step. An aggregated crystalline precipitate was formed, and samples of the aqueous suspension of this product (Suspension D), which resulted from the carbonation of the mixture of the original suspension and calcium hydroxide, and which contained 3.6% by weight of dry solids, were tested for filtration rate and the filtrate obtained in the filtration test was tested for turbidity.

A further sample of the aqueous suspension of the product obtained from the carbonation step was allowed to settle under gravity, and a layer of substantially clear water which formed on top of the suspension was removed. The remaining thickened suspension was found to contain 9.6% by dry weight of solids. Samples of this thickened suspension (Suspension E) were tested for filtration rate and the filtrate obtained in the filtration test was tested for turbidity.

A yet further sample of the aqueous suspension of the product obtained from the carbonation step was filtered to form a cake containing 35.0% by weight of dry solids. Samples of this suspension (Suspension F) were tested for filtration rate and the filtrate obtained in the filtration test was tested for turbidity.

21

The results are set forth in Table 8 below:

TABLE 8

| Suspension | Filtration Rate | Turbidity |
| --- | --- | --- |
| Untreated Suspension (1.8% wt Solids) | 0.028 | 38.8 |
| Suspension D | 0.42 | 14.5 |
| Suspension E | 0.51 | 15.3 |
| Suspension F2 | 0.11 | 7.4 |

These results show that, within the limits of experimental error, the filtration rate and filtrate turbidity are the same for Suspensions D and E. The filtration rate for Suspension F is slightly inferior, and the filtration turbidity slightly superior, as compared with the results for Suspensions D and E. Filtration rate and turbidity are improved over the original untreated suspension in the case of each of Suspensions D, E and F.

The properties of hand sheets prepared and tested as described in Example 1 and containing the aggregated crystalline precipitate and fines filler produced by the method embodying the invention are set forth in Table 9 below:

TABLE 9

| Filler | Scattering $m^2kg^{-1}$ | Opacity (%) | Burst ratio (% of value for unfilled sheet) |
| --- | --- | --- | --- |
| Unfilled | 24.8 | 68.8 | 100 |
| Suspension D | 56 | 91.5 | 66 |
| Suspension E | 53 | 91.5 | 66 |
| Suspension F | 56 | 91.5 | 62 |

The results in Table 9 show that, within the limits of experimental error, the scattering, opacity and burst ratio are the same for each of the fillers (of varying states of water addition) produced using Suspensions D, E and F. Thus, the extent of concentration or dilution of an aqueous suspension applied to the aggregated precipitate and fines formed in the method according to the present invention does not materially affect the properties shown in Table 18 of a sheet composition incorporating the aggregated precipitate as a filler material.

EXAMPLE 8

A sample of waste water from a paper mill recirculation system was diluted to form a suspension containing 2.0% by weight of suspended solids which were fines consisting predominantly of cellulosic microfibres, but also contained a smaller proportion of inorganic filler particles. There was added to a 1 liter sample of this diluted waste water 113.7 g of a suspension containing 13.02% by weight of calcium hydroxide, this weight of the suspension being sufficient to provide 14.8 g of $Ca(OH)_2$ per liter of waste water. This amount of calcium hydroxide, if fully carbonated, was calculated to provide a weight of calcium carbonate which was equal to the weight of dry solids in the sample of waste water. The suspension of calcium hydroxide was prepared by adding 148 g of hydrated lime to 1 liter of water with vigorous agitation. The milk of lime suspension thus formed was passed through a sieve of aperture size 125 μm to remove oversize particles. The concentration of calcium hydroxide in the suspension was determined by titration of a sample with a 1M solution of hydrochloric acid.

Carbon dioxide gas was admitted into the suspension at a rate of 0.18 moles of carbon dioxide per minute per mole of calcium hydroxide. The temperature of the suspension during carbonation was maintained at 35° C.

Figure 5:
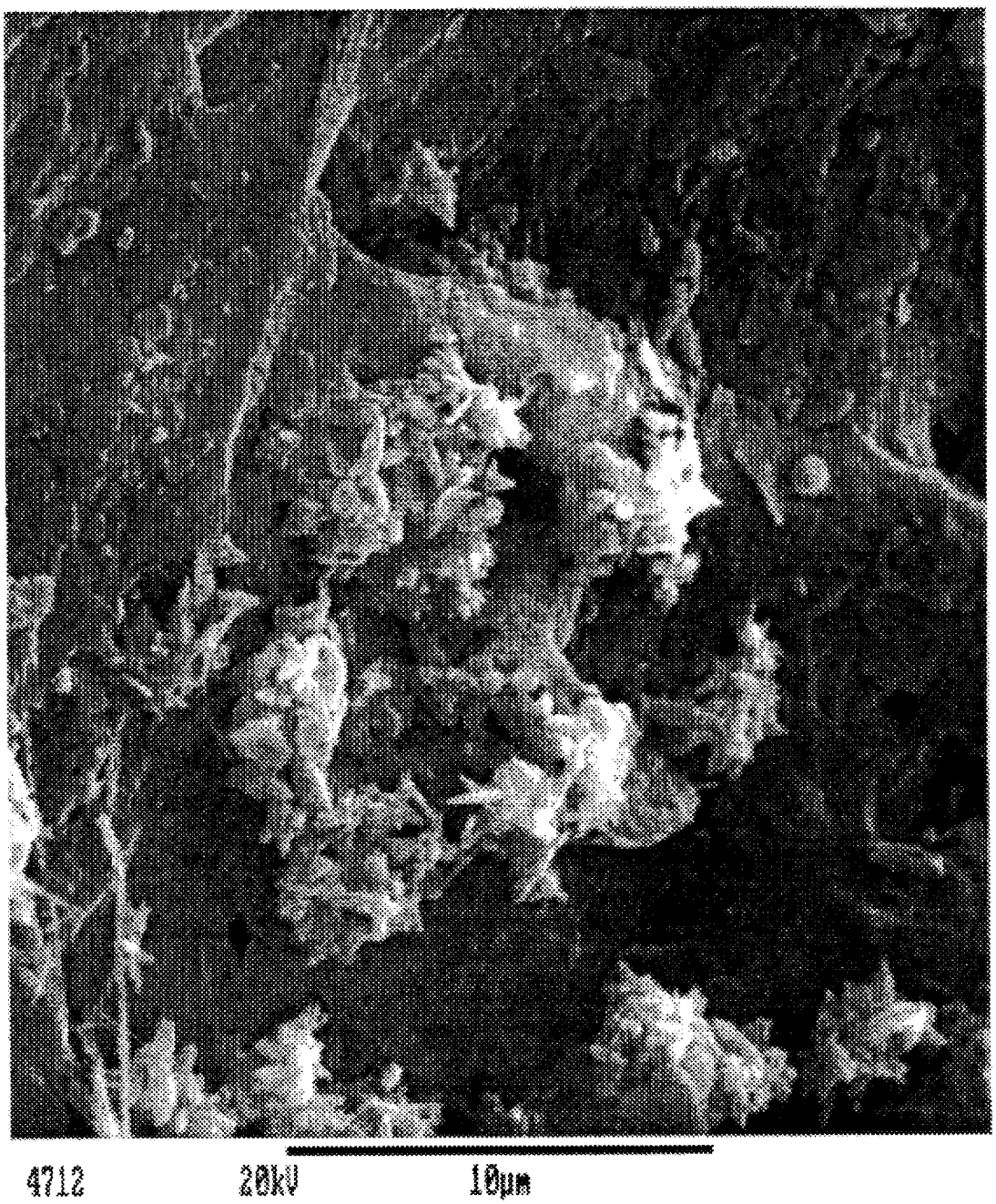
FIGS. 5 to 7 are photomicrographs of various aggregated precipitate and fines products obtained using methods embodying the present invention.

An aggregated crystalline precipitate and fines product was formed and this was separated from the supernatant liquid by means of a vacuum disc filter. The cake thus formed was dried and examined under a scanning electron microscope to examine the crystal form of the solids present. The electron micrograph thus obtained is shown in FIG. 5. It can be seen that the product consists predominantly of the particles and fibres which were originally present and calcium carbonate in the form of clusters of spindle-shaped crystals, each spindle having the shape of two elongated pyramids joined at their bases. This morphology is typical of the scalenohedral form of precipitated calcium carbonate.

The filter cake which was obtained by filtering the aqueous suspension containing the crystalline precipitate was dried and pulverised and the resultant pulverised material used as a filler in a paper making composition.

Hand sheets of paper filled with the crystalline precipitate prepared as described above were prepared in the following way. 400 g of bleached sulphite spruce pulp were soaked in 10 liters of filtered water for 4 hours and the mixture was then disintegrated for 10 minutes in a turbine mixer, the impeller rotating at a speed of 1500 rpm. The contents of the mixer were washed out with a further 10 liters of water and transferred to a laboratory beater where a further 2 liters of water was added and the mixture beaten for 16½ minutes. At this stage the stock contained approximately 1.8% by weight of dry pulp. The beating time was chosen to give the optimum compromise between brightness and strength properties of the stock which corresponds to a Canadian Standard Freeness of 300. 800 ml of the stock was then made up to 2 liters with water and disintegrated in a laboratory disintegrator which was operated for 15,000 revolutions of the impeller. The volume of stock was made up to 4 liters with filtered water and the consistency was checked by forming a paper sheet from a small sample by draining on a suitable wire screen and drying and weighing the sheet thus formed. Water was added if necessary to reduce the consistency to 0.3% by weight of dry pulp.

The paper making stock thus formed was divided into three portions and a different amount of the pulverised crystalline precipitate was added to each portion and stirred in by hand.

Hand sheets were prepared from each of the three portions of filler-containing paper making stock according to the procedure laid down in TAPPI Standard No. T205 om-88, "Forming handsheets for physical tests of pulp". For each hand sheet 400 ml of the stock was poured into the sheet forming machine and surplus water was removed.

The ash, or inorganic material, content of the paper formed from each of the three portions of stock was determined by incinerating a sample of paper formed from the stock according to the procedure laid down in TAPPI Standard No. T413 om-85.

The scattering coefficient S was determined in the manner described above and was plotted graphically against the percentage by weight of filler in the batch of paper, and the coefficient corresponding to a loading of 20% by weight of filler was found by interpolation. This scattering coefficient was found to be 53 $m^2.kg^{-1}$ which is much greater than the value for the pulp fibres per se, ie. about 30 $m^2kg^{-1}$.

EXAMPLE 9

A further 1 liter sample of the same diluted paper mill waste water treated and investigated as in Example 8 was treated with sufficient of the calcium hydroxide suspension prepared as described in Example 8 to provide 44.4 g of calcium hydroxide per liter of the waste water. This amount of calcium hydroxide, if fully carbonated, was calculated to provide a weight of calcium carbonate which was equal to three times the weight of dry solids in the sample of waste water.

Carbon dioxide gas was admitted into the suspension at a rate of 0.067 moles of carbon dioxide per minute per mole of calcium hydroxide. The temperature of the suspension during carbonation was maintained at 35° C.

Figure 6:
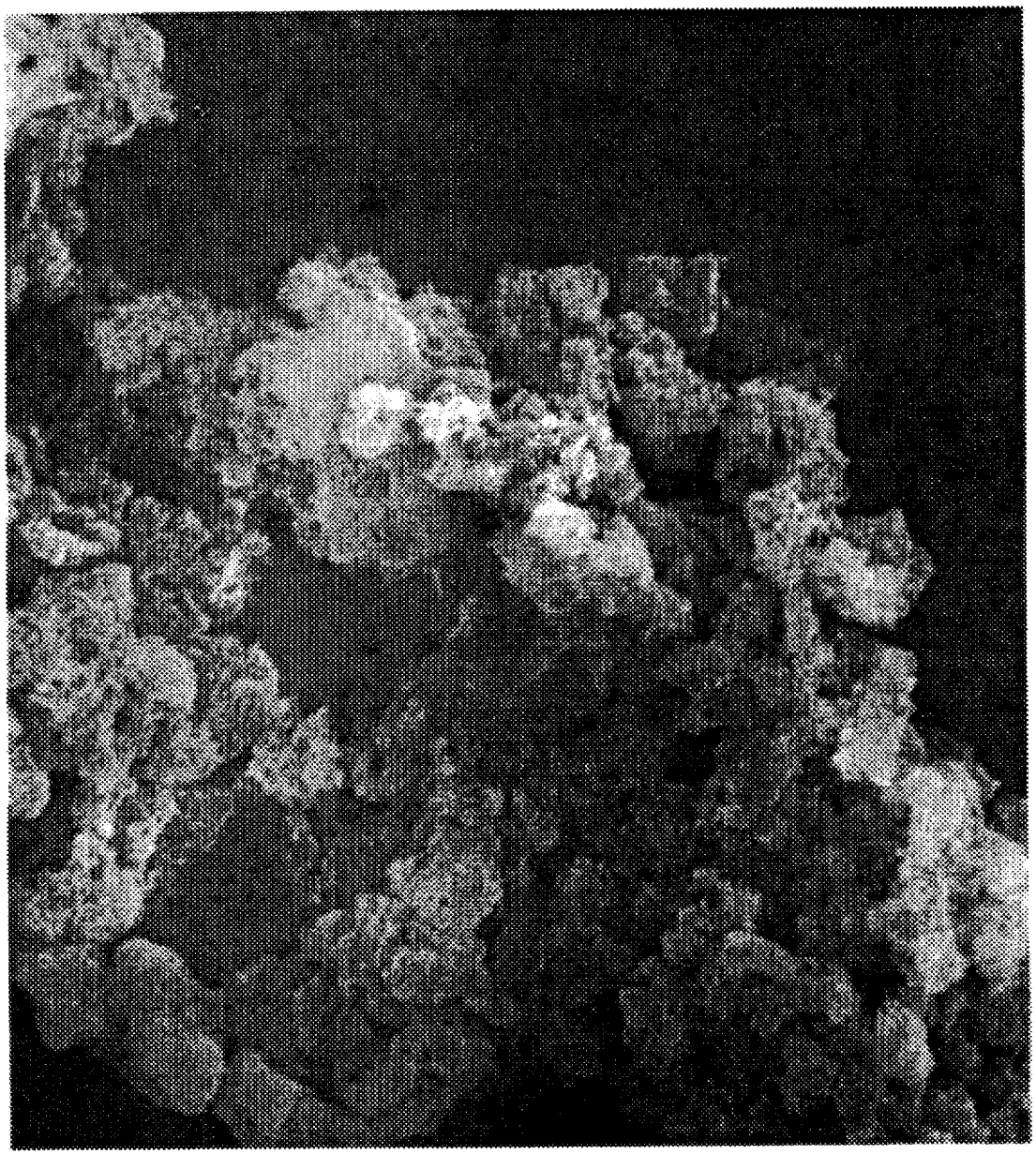

An aggregated crystalline precipitate was formed and this was separated from the supernatant liquid by means of a vacuum disc filter. The cake thus formed was dried and examined under the scanning electron microscope. The electron micrograph thus obtained is shown in FIG. 6. It can be seen that the crystalline precipitate consists predominantly of calcium carbonate in the form of blocky, substantially isotropic crystals. This morphology is typical of the rhombohedral form of precipitated calcium carbonate.

The scattering coefficient S was measured by the technique described in Example 4 above and was found to be 110 $m^2kg^{-1}$ which is much greater than the value of about 30 $m^2kg^{-1}$ for the pulp fibres per se.

EXAMPLE 10

A sample of waste water from the recirculation system of a paper mill was found to contain 0.37% by weight of suspended solids which were fines consisting predominantly of cellulosic microfibres, but also contained a smaller proportion of inorganic filler particles. A one liter sample of the waste water was treated with sufficient of the calcium hydroxide suspension prepared as described in Example 8 to provide 2.74 g of calcium hydroxide per liter of the waste water. This amount of calcium hydroxide, if fully carbonated, was calculated to provide a weight of calcium carbonate which is equal to the weight of dry solids in the sample of waste water. This amount of calcium hydroxide, if fully carbonated, was calculated to provide a weight of calcium carbonate which was equal to the weight of dry solids in the sample of waste water.

Carbon dioxide gas was admitted into the suspension at a rate of 0.11 moles of carbon dioxide per minute per mole of calcium hydroxide. The temperature of the suspension during carbonation was maintained at 50° C.

Figure 7:
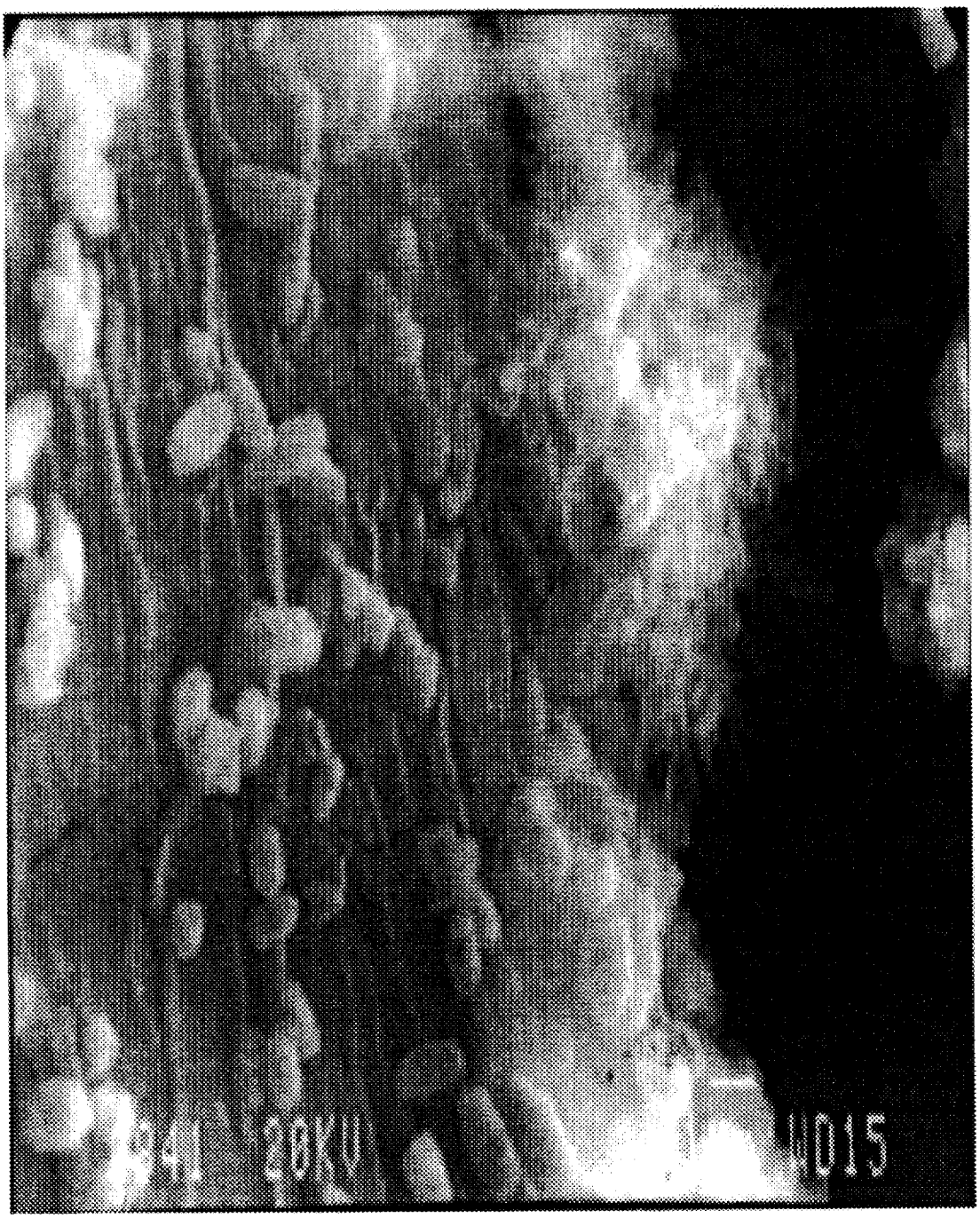

An aggregated crystalline precipitate and fines product was formed and this was separated from the supernatant liquid by means of a vacuum disc filter. The cake thus formed was dried and examined under the scanning electron microscope. The electron micrograph thus obtained is shown in FIG. 7. It can be seen that the crystalline precipitate consists predominantly of the particles and microfibres which were originally present and calcium carbonate, some of which are in the form of blocky, rhombohedral crystals, and some in the form of fine, elongated needles, which are characteristic of the aragonite form of calcium carbonate. The scattering coefficient of the aggregate was measured and found to be greater than 100 $m^2 kg^{-1}$.

Examples 8 to 10 illustrate that although various forms of crystal structure may be obtained in the aggregated precipitate and fines product produced by methods embodying the present invention, the usefulness of the aggregated precipitate in filler applications is not seriously affected by the crystal form(s) obtained.

APPENDIX 1
Filtration Rate Measurement Method

A small sample of the suspension of the mixed mineral produced was poured into a Buchner filter funnel provided with a piece of standard filter paper, the side arm of the filtrate flask being connected to the laboratory vacuum source. The filtrate was collected in a measuring cylinder inside the filtrate flask, and at intervals the volume of filtrate collected and the time which had elapsed since the start of filtration were recorded. The square of the volume collected was plotted graphically against the elapsed time, and a curve was obtained which had a large central straight line portion. The slope of this straight line portion was recorded in each case.

The relationship between the square of the volume of filtrate collected and the elapsed time is given by the Carmen-Kozeny equation:

$$\frac{Q^2}{T} = \frac{2 \cdot A^2 \cdot P \cdot E^3 \cdot (y-1)}{5 \cdot v \cdot S^2 \cdot (1-E)^2 \cdot d^2}$$

where

Q is the volume of filtrate collected;

T is the elapsed filtration time;

A is the area of the filter medium;

P is the differential pressure across the filter medium;

E is the fraction of voidage in the filter cake;

v is the viscosity of the suspending medium;

S is the specific surface area of the particulate phase; and d is the specific gravity of the particulate phase.

The slope $Q^2/T$ of the straight line portion of the graph plotted for each suspension gives a measure of the filtration rate in each case and, since A, P, v, S and d can be assumed to be constant under the conditions of the experiment, a standardised filtration rate F can be found to be given by:

$$F = \frac{Q^2 \cdot R}{T}$$

where $$R = \frac{\frac{1}{d} + \frac{W_c}{S_c}}{\frac{W_s}{S_s} - \frac{W_c}{S_c}}$$

where:

$W_c$ is the weight fraction of water in the cake;

$S_c$ is the weight fraction of solids in the cake;

$W_s$ is the weight fraction of water in the suspension; and $S_s$ is the weight fraction of solids in the suspension.

We claim:

1. A method for recovery and use of fines present in a waste water stream produced in a paper sheet-forming or paper coating process, said fines being present in the stream in an amount of at least about 0.1% by weight and comprising particles which have passed through but have not been retained by the paper sheet-forming or paper coating process, said particles being capable of passing through a round hole of diameter 76 μm in accordance with TAPPI Standard No. T 261 cm-90, which method includes at least one stage in which an alkaline earth metal carbonate is precipitated in said stream whereby said particles become entrained in the precipitate to form a mixed aggregated material and which includes the steps of recovering said material and supplying said material for use in a process in which said material is to be used as a filler or pigment.

2. A method as claimed in claim 1 and which includes the step of incorporating the mixed aggregated material into a paper making composition together with cellulose fibres.

3. A method as claimed in claim 2 and wherein the mixed aggregated material is delivered to a paper making plant for incorporating in the paper making composition.

4. A method as claimed in claim 3 and wherein the mixed aggregated material is concentrated by dewatering prior to delivery to the paper making plant.

5. A method as claimed in claim 4 and wherein water separated from the mixed aggregated material by the dewatering is recycled for re-use in the paper making process of the paper mill.

6. A method as claimed in claim 3 and wherein the mixed aggregated material is delivered in dilute aqueous suspension form without dewatering to the paper making plant.

7. A method as claimed in claim 1 and which includes the step of incorporating the mixed aggregated material into a paper coating composition together with a water soluble adhesive.

8. A method according to claim 1 and wherein the fines-containing aqueous suspension contains not less than about 1% and about 10% by weight of solids.

9. A method according to claim 8 and wherein the fines-containing aqueous suspension contains not less than about 1% and not more than about 5% by weight solids.

10. A method according to claim 9 and wherein the fines-containing stream of waste water is diluted or concentrated to produce the said aqueous suspension.

11. A method as claimed in claim 1 and wherein the alkaline earth metal carbonate precipitate is formed by introducing into the aqueous suspension a source of alkaline earth metal ions and a source of carbonate ions.

12. A method as claimed in claim 11 and wherein the alkaline earth metal is calcium.

13. A method as claimed in claim 11, wherein the source of alkaline earth metal ions is added to the aqueous suspension first followed by the source of carbonate ions.

14. A method as claimed in claim 11 and wherein the source of alkaline earth metal ions is an alkaline earth metal hydroxide or a water-soluble alkaline earth metal salt.

15. A method as claimed in claim 14 and wherein the source of alkaline earth metal ions is the alkaline earth metal hydroxide which is added ready prepared to the aqueous suspension.

16. A method as claimed in claim 14 and wherein the source of alkaline earth metal ions is the alkaline earth metal hydroxide which is prepared in situ.

17. A method as claimed in claim 11 and wherein the source of carbonate ions comprises carbon dioxide containing gas which is introduced into the suspension containing the source of alkaline earth metal ions.

18. A method as claimed in claim 17 and wherein the carbon dioxide containing gas contains from 5% to 100% by volume of carbon dioxide.

19. A method as claimed in claim 11 and wherein the source of carbonate ions is an alkali metal carbonate or ammonium carbonate.

20. A method as claimed in claim 11 and in which the source of alkaline earth metal ions is an alkaline earth metal hydroxide and the source of carbonate ions is a carbon dioxide containing gas.

21. A method as claimed in claim 11 and wherein the quantity of the source of alkaline earth metal ions and of the source of carbonate ions used is such as to precipitate sufficient alkaline earth metal carbonate to give a weight ratio of alkaline earth metal carbonate to fine particulate material in the range from 1:99 to 90:10.

* * * * *